(12) United States Patent
Chai

(10) Patent No.: US 6,225,776 B1
(45) Date of Patent: May 1, 2001

(54) CHARGING STATION FOR ELECTRIC-POWERED VEHICLES

(76) Inventor: Wellmon Chai, No. 17, Lane 48, Han-Hsi-Wu St., Tung Dist., Taichung City (TW)

( * ) Notice: Subject to any disclaimer, the term of this patent is extended or adjusted under 35 U.S.C. 154(b) by 0 days.

(21) Appl. No.: 09/641,402

(22) Filed: Aug. 17, 2000

(51) Int. Cl.$^7$ ....................................... H02J 7/00
(52) U.S. Cl. ............................................ 320/109
(58) Field of Search ................................ 320/109

(56) References Cited

U.S. PATENT DOCUMENTS

| | | | |
|---|---|---|---|
| 4,012,681 | * | 3/1977 | Finger et al. ..................... 320/109 |
| 4,383,210 | * | 5/1983 | Wilkinson ......................... 320/109 |
| 5,202,617 | * | 4/1993 | Nor .................................. 320/109 |
| 5,263,565 | * | 11/1993 | Wilkinson ......................... 320/109 |
| 5,548,200 | * | 8/1996 | Nor et al. ......................... 320/109 |
| 5,594,318 | * | 1/1997 | Nor et al. ......................... 320/109 |
| 6,087,805 | * | 7/2000 | Langston et al. ................. 320/109 |
| 6,114,833 | * | 9/2000 | Langston et al. ................. 320/109 |

* cited by examiner

Primary Examiner—Peter S. Wong
Assistant Examiner—Pia Tibbits
(74) Attorney, Agent, or Firm—Sughrue, Mion, Zinn, Macpeak & Seas, PLLC

(57) ABSTRACT

A charging station includes a plurality of charging sockets, each of which is adapted to be connected to an electric-powered vehicle, and a plurality of switch units, each of which includes a relay switch that interconnects a power supplying circuit and a respective charging socket, and a trigger member connected to the relay switch and controllable so as to control in turn the relay switch to make or break electrical connection between the power supplying circuit and the respective charging socket. A current monitoring unit generates output signals corresponding to amount of current flowing through each of the charging sockets. A processing unit receives the output signals from the current monitoring unit, and controls the trigger members of the switch units to ensure the total amount of current flow through the charging sockets does not exceed a rated current value for the charging station.

7 Claims, 4 Drawing Sheets

|  | FIRST CHARGING SOCKET | SECOND CHARGING SOCKET | THIRD CHARGING SOCKET | FOURTH CHARGING SOCKET | TOTAL CHARGING CURRENT |
|---|---|---|---|---|---|
| INITIAL | 8A | 8A | 0 | 0 | 16A < 20A |
| FIRST DISTRIBUTION | 5A | 5A | 8A | 0 | 18A < 20A |
| SECOND DISTRIBUTION | 2A | 2A | 5A | 8A | 17A < 20A |

FIG. 4

CHARGING STATION FOR ELECTRIC-POWERED VEHICLES

BACKGROUND OF THE INVENTION

1. Field of the Invention

The invention relates to a charging station for electric-powered vehicles, more particularly to a charging station capable of automatic control of charging current that is supplied to a plurality of loads.

2. Description of the Related Art

The battery of an electric-powered vehicle is generally charged at a charging station that is accessible to the public. While a charging station is capable of charging the batteries of a number of electric-powered vehicles at the same time, the total amount of charging current supplied by the charging station at any time should not exceed a rated value. For example, if a charging station is capable of charging the batteries of four electric-powered vehicles simultaneously, and the initial load current that should be supplied to charge the battery of each of the electric-powered vehicles is 8 amperes, the rated current value for the charging station should be at least 32 amperes to prevent occurrence of an overload. Thus, aside from the need to coordinate with the local electric power company in view of the large current requirement, the power distribution network of the charging station should also be designed to handle such large current flows.

However, it is noted that the charging current requirement of a battery decreases from a maximum value (i.e. the battery is fully discharged) to a minimum value (i.e. the battery is fully charged) as the charging operation progresses. As such, it is very unlikely that the charging station will operate at full load conditions most of the time. The conventional charging station is thus uneconomical since it is designed under full load conditions.

SUMMARY OF THE INVENTION

Therefore, the object of the present invention is to provide a charging station capable of automatic control of charging current that is supplied to a plurality of loads so as to result in an economical design while preventing the occurrence of an overload.

According to this invention, a charging station for electric-powered vehicles comprises:

a power supplying circuit;

a plurality of charging sockets, each of which is adapted to be connected to one of the electric-powered vehicles;

a switching circuit including a plurality of switch units, each of the switch units including a relay switch that interconnects the power supplying circuit and a respective one of the charging sockets, and a trigger member connected to the relay switch and controllable so as to control in turn the relay switch to make or break electrical connection between the power supplying circuit and the respective one of the charging sockets;

a current monitoring unit connected to the charging sockets and operable so as to generate output signals corresponding to amount of current flowing through each of the charging sockets; and a processing unit connected to the current monitoring unit and the trigger members of the switch units, the processing unit receiving the output signals from the current monitoring unit and controlling the trigger members of the switch units to ensure total amount of current flow through the charging sockets does not exceed a rated current value for the charging station.

BRIEF DESCRIPTION OF THE DRAWINGS

Other features and advantages of the present invention will become apparent in the following detailed description of the preferred embodiment with reference to the accompanying drawings, of which:

FIG. 4 is a table to illustrate a sample operation of the preferred embodiment.

DETAILED DESCRIPTION OF THE PREFERRED EMBODIMENT

Figure 1:
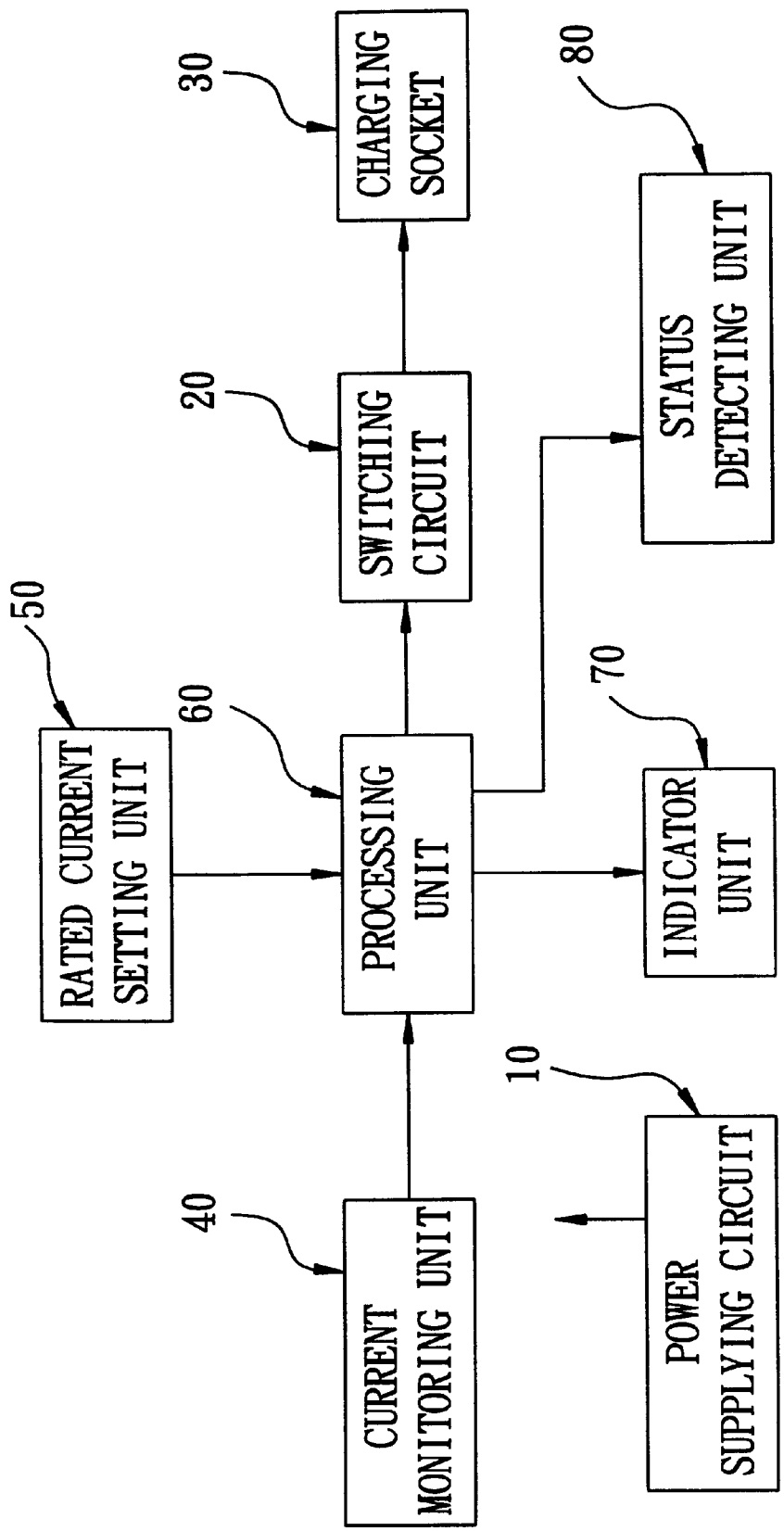
FIG. 1 is a schematic circuit block diagram showing the preferred embodiment of a charging station according to the present invention.
Figure 2:
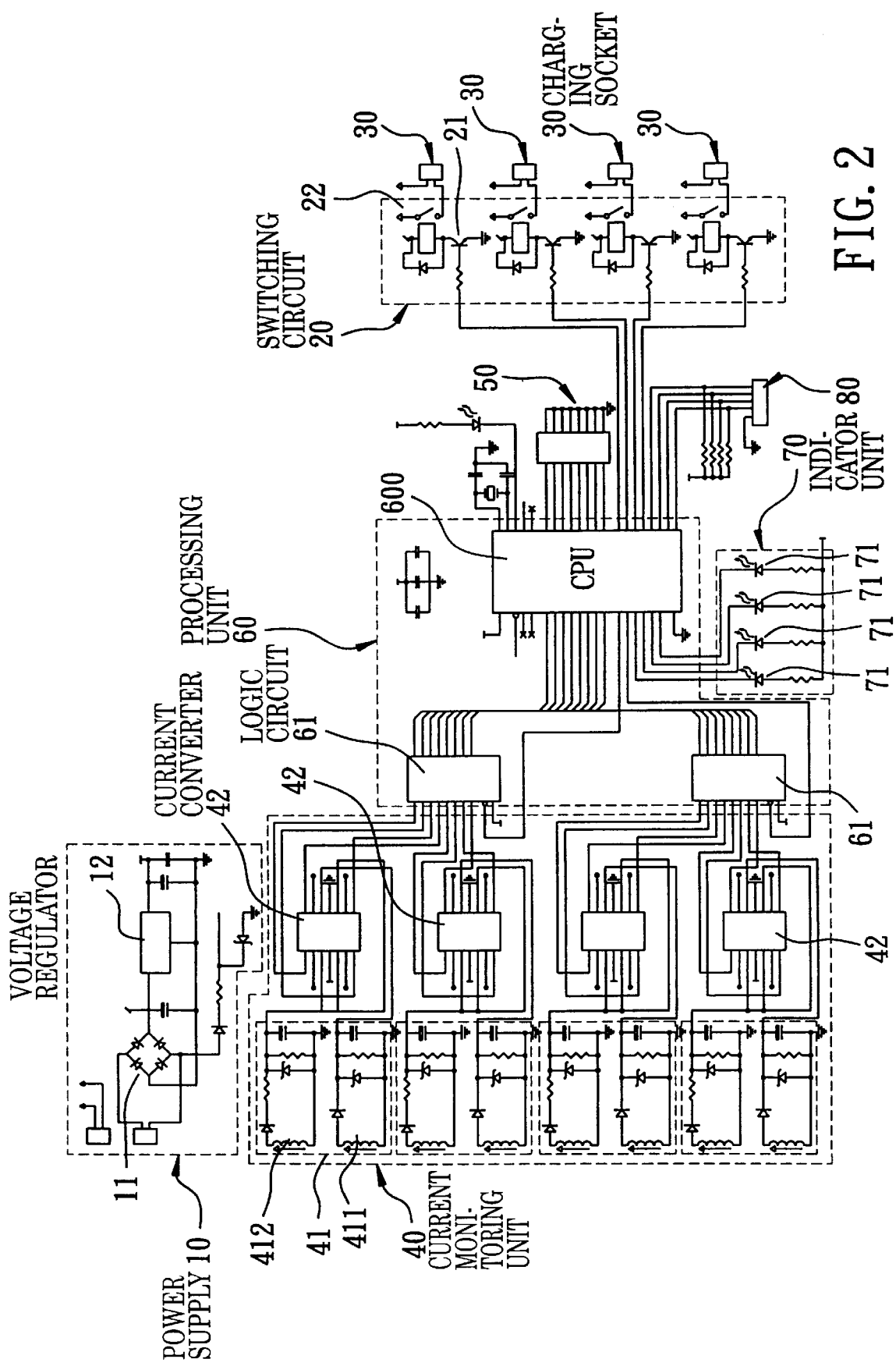
FIG. 2 is a schematic electrical circuit diagram of the preferred embodiment.

Referring to FIGS. 1 and 2, the preferred embodiment of a charging station according to the present invention is shown to comprise a power supplying circuit 10, a switching circuit 20, a plurality of charging sockets 30, a current monitoring unit 40, a rated current setting unit 50, a processing unit 60, an indicator unit 70 and a status detecting unit 80.

The power supplying circuit 10 is adapted to be connected to a commercial AC power provider, and includes a diode rectifier 11 and a voltage regulator 12. The power supplying circuit 10 operates in a known manner to convert AC power into DC power.

The switching circuit 20 includes a plurality of switch units, each of which has a relay switch 22 and a trigger member 21 connected to the relay switch 22. In this embodiment, the trigger member 21 is a transistor.

Each of the charging sockets 30 is connected to the power supplying circuit 10 via the relay switch 22 of a respective one of the switch units of the switching circuit 20. In this embodiment, there are four charging sockets 30.

The current monitoring unit 40 includes a plurality of current sampling sets 41 and a plurality of current converters 42. Each of the current sampling sets 41 is connected to a respective one of the charging sockets 30, and includes a first current sampler 411 for detecting current leakage, and a second current sampler 412 for detecting current flow through the respective one of the charging sockets 30. Each of the current converters 42 is connected to a respective one of the current sampling sets 41. In this embodiment, each of the current converters 42 is provided with switches (not shown) that are operable so as to enable the current converter 42 to generate an output signal corresponding to the amount of current flowing through the respective one of the charging sockets 30. In the preferred embodiment, the current converter 42 generates a first output when the amount of current flowing through the respective charging socket 30 is between 0 and 2 amperes, a second output when the amount of current flowing through the respective charging socket 30 is between 2 and 5 amperes, a third output when the amount of current flowing through the respective charging socket 30 is between 5 and 10 amperes, and a fourth output when the amount of current flowing through the respective charging socket 30 is in excess of 10 amperes.

The rated current setting unit 50 is operable so as to set a rated current value for the charging station.

The processing unit 60 includes a central processing unit (CPU) 600. In the preferred embodiment, a pair of logic circuits 61 connects the CPU 600 to output terminals of the current converters 42. The logic circuits 61 encode the output signals from the current converters 42 to reduce the required number of pin connections between the CPU 600 and the current converters 42. The CPU 600 is further connected to the rated current setting unit 50 and the trigger members 21 of the switch units of the switching circuit 20. According to the output signals from the current converters 42 and the rated current value as set by the setting unit 50, the CPU 600 controls the trigger members 21 to control in turn the relay switches 22 and the current flow through the charging sockets 30.

The indicator unit 70 is connected to the CPU 600 and includes a plurality of indicator lamps 71. Each of the indicator lamps 71 is activated by the CPU 600 to indicate the operating state of an associated one of the charging sockets 30.

Figure 3:
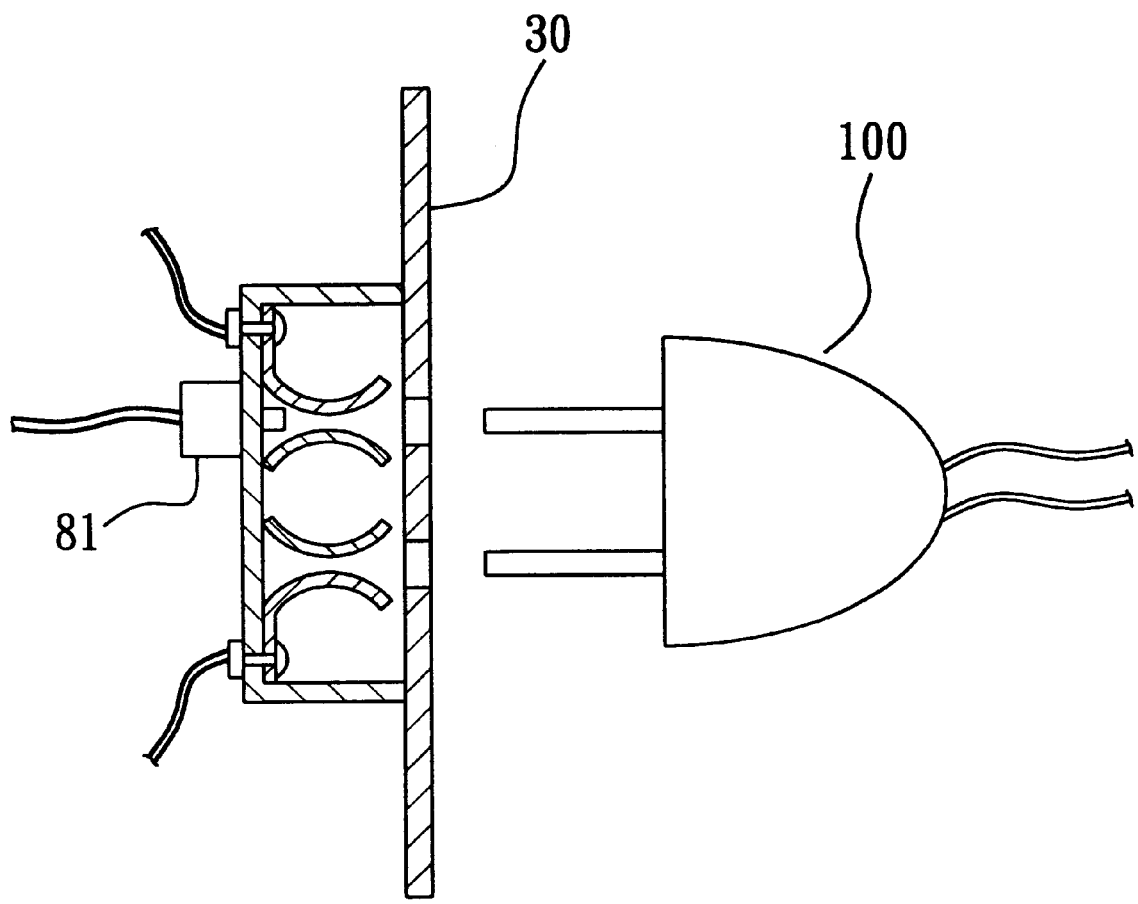
FIG. 3 is a fragmentary partly cross-sectional view illustrating how an electric-powered vehicle is connected to a charging socket of the preferred embodiment.

With further reference to FIG. 3, the status detecting unit 80 is connected to the CPU 600 and includes a plurality of micro switches 81 (only one is shown in FIG. 3), each of which is mounted to a respective one of the charging sockets 30. When the plug 100 of an electric-powered vehicle (not shown) is connected to the charging socket 30, the respective micro switch 81 is activated and generates an electric signal to inform the CPU 600 that the charging socket 30 is in use.

FIG. 4 is a table to illustrate a sample operation of the preferred embodiment. In this example, the rated current value for the charging station is set to 20 amperes, and the initial load current that should be supplied to charge the battery of an electric-powered vehicles is 8 amperes. Initially, the CPU 600 enables 8 amperes of current to be supplied to each of the first and second charging sockets 30, and activates the indicator lamps 71 that are associated with the first and second charging sockets 30 to generate a constant light output, indicative of a charging state. At this time, when an electric-powered vehicle is connected to the third charging socket 30, the CPU 600 will control the trigger member 21 of the switch unit that is associated with the third charging socket 30 to break electrical connection between the power supplying circuit 10 and the third charging socket 30 and prevent current flow through the third charging socket 30. The CPU 600 will further activate the indicator lamp 71 that is associated with the third charging socket 30 to generate a blinking light output, indicative of a waiting state. The total current flowing through the charging station is 16 amperes, which is less than the rated current value of 20 amperes to prevent the occurrence of an overload.

As the charging operation progresses, the charging current that flows through the first and second charging sockets 30 will eventually drop to 5 amperes. At this time, the CPU 600 will control the trigger member 21 of the switch unit that is associated with the third charging socket 30 to enable 8 amperes of current to flow through the latter, and will further activate the indicator lamp 71 that is associated with the third charging socket 30 to generate the constant light output. Subsequently, when an electric-powered vehicle is connected to the fourth charging socket 30, the CPU 600 will control the trigger member 21 of the switch unit that is associated with the fourth charging socket 30 to break electrical connection between the power supplying circuit 10 and the fourth charging socket 30 and prevent current flow through the fourth charging socket 30. The CPU 600 will further activate the indicator lamp 71 that is associated with the fourth charging socket 30 to generate the blinking light output. The total current flowing through the charging station increases to 18 amperes, which is still less than the rated current value of 20 amperes to prevent the occurrence of an overload.

As the charging operation continues, the charging current that flows through the first and second charging sockets 30 will eventually drop to 2 amperes, and the charging current that flows through the third charging socket 30 will eventually drop to 5 amperes. At this time, the CPU 600 will control the trigger member 21 of the switch unit that is associated with the fourth charging socket 30 to enable 8 amperes of current to flow through the latter, and will further activate the indicator lamp 71 that is associated with the fourth charging socket 30 to generate the constant light output. The total current flowing through the charging station is 17 amperes, which is less than the rated current value of 20 amperes.

It has thus been shown that the charging station of the present invention is capable of automatic control of charging current that is supplied to a plurality of loads (e.g. the batteries of electric-powered vehicles) so as to result in an economical design while preventing the occurrence of an overload. The object of the invention is thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A charging station for electric-powered vehicles, comprising:

a power supplying circuit;

a plurality of charging sockets, each of which is adapted to be connected to one of the electric-powered vehicles;

a switching circuit including a plurality of switch units, each of said switch units including a relay switch that interconnects said power supplying circuit and a respective one of said charging sockets, and a trigger member connected to said relay switch and controllable so as to control in turn said relay switch to make or break electrical connection between said power supplying circuit and the respective one of said charging sockets;

a current monitoring unit connected to said charging sockets and operable so as to generate output signals corresponding to amount of current flowing through each of said charging sockets; and a processing unit connected to said current monitoring unit and said trigger members of said switch units, said processing unit receiving the output signals from said current monitoring unit and controlling said trigger members of said switch units to ensure total amount of current flow through said charging sockets does not exceed a rated current value for said charging station.

2. The charging station of claim 1, further comprising a rated current setting unit connected to said processing unit and operable so as to set the rated current value for said charging station.

3. The charging station of claim 1, further comprising an indicator unit connected to said processing unit, said indicator unit including a plurality of indicator lamps, each of which is associated with a respective one of said charging sockets and is controlled by said processing unit to indicate operating state of the respective one of said charging sockets.

4. The charging station of claim 1, wherein said trigger member is a transistor.

5. The charging station of claim 1, further comprising a status detecting unit connected to said processing unit, said status detecting unit including a plurality of micro switches, each of which is operably associated with a respective one of said charging sockets and is adapted to generate an electrical signal that is received by said processing unit when the respective one of said charging sockets is in use.

6. The charging station of claim 1, wherein said current monitoring unit includes:

current sampling means for sampling the currents flowing through each of said charging sockets; and current converter means, connected to said current sampling means, for converting the currents sampled by said current sampling means into the output signals to be received by said processing unit.

7. The charging station of claim 1, wherein said processing unit includes:

logic circuit means, connected to said current monitoring unit, for encoding the output signals from said current monitoring unit; and a central processing unit connected to said logic circuit means.

* * * * *